United States Patent [19]

Taleyarkhan et al.

[11] Patent Number: 4,753,774
[45] Date of Patent: Jun. 28, 1988

[54] ORIFICING OF WATER CROSS INLET IN BWR FUEL ASSEMBLY

[75] Inventors: Rusi P. Taleyarkhan, Pittsburgh; Claude M. Mildrum, Monroeville, both of Pa.

[73] Assignee: Westinghouse Electric Corp., Pittsburgh, Pa.

[21] Appl. No.: 826,523

[22] Filed: Feb. 6, 1986

[51] Int. Cl.[4] ............................................. G21C 3/32
[52] U.S. Cl. .................................... 376/444; 376/443
[58] Field of Search ......................... 376/443, 444, 434

[56] References Cited

U.S. PATENT DOCUMENTS 3,158,543 11/1964 Sherman et al. .
4,478,786 10/1984 Andersson et al. ............. 376/434 X
4,526,744 7/1985 Borrman et al. ................. 376/434 X

FOREIGN PATENT DOCUMENTS 1150423 7/1983 Canada .

Primary Examiner—John F. Terapane
Assistant Examiner—John S. Maples

[57] ABSTRACT

A BWR fuel assembly has a bundle of spaced fuel rods, an outer tubular flow channel surrounding the fuel rods so as to direct flow of coolant/moderator fluid along the fuel rods, and a hollow central water cross with opposed walls, a lower flow inlet end, an opposite upper flow outlet end, and an open inner cruciform flow channel for subcooled moderator fluid flow through the fuel assembly. The water cross extends through the outer flow channel and is interconnected with the outer channel so as to divide it into separate compartments and the bundle of fuel rods into a plurality of mini-bundles thereof. Also, a pair of upper and lower tie plates are connected to the opposite ends of the fuel rods in each mini-bundle thereof so as to provide a separate fuel rod subassembly in each of the compartments. The tie plates have flow openings defined therethrough for allowing the flow of the coolant/ moderator fluid into and from the separate fuel rod subsasembly. The BWR includes an improvement which allows selected flow into said water cross and cross flow of fluid between the lower ends of the respective fuel rod mini-bundles of the separate fuel rod subassemblies and in such manner minimizes maldistribution of flow between the mini-bundles. The improvement comprises cross flow inlet means in the form of opposed holes located in the opposed walls of the water cross above the lower tie plates of the mini-bundles.

11 Claims, 4 Drawing Sheets

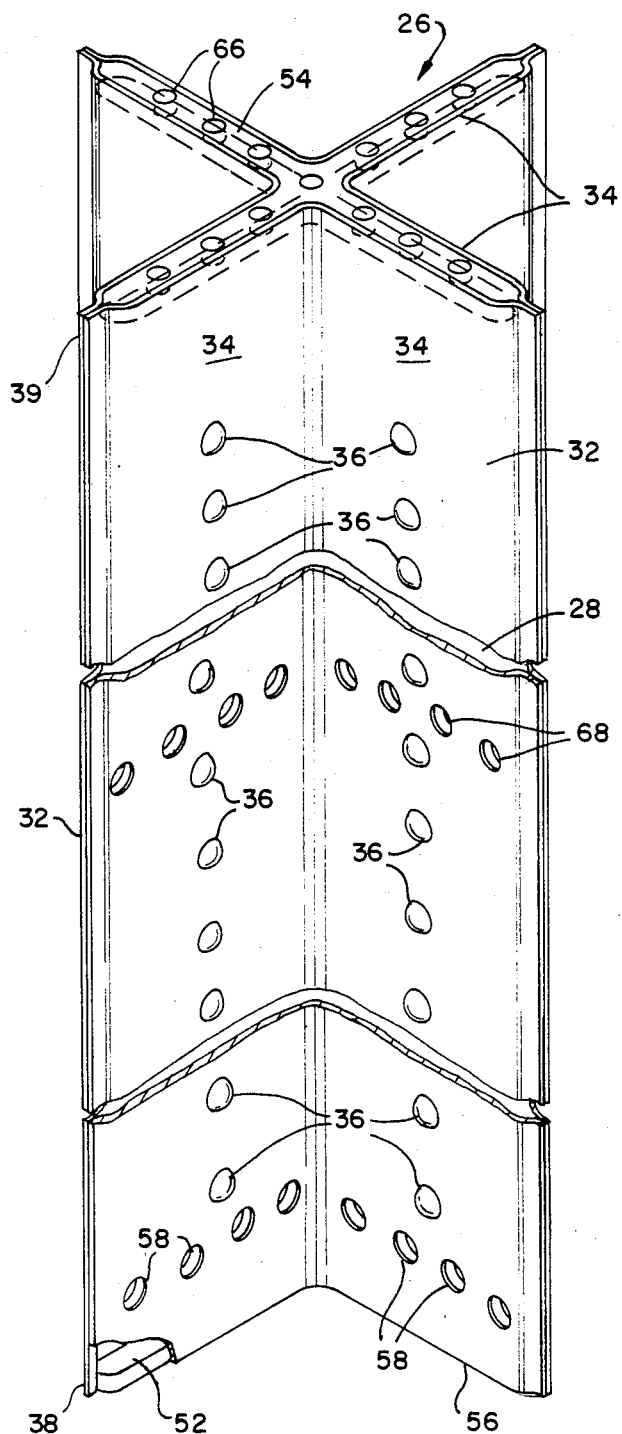

ORIFICING OF WATER CROSS INLET IN BWR FUEL ASSEMBLY

CROSS-REFEENCE TO RELATED APPLICATIONS

Reference is hereby made to the following copending applications dealing with related subject matter and assigned to the assignee of the present invention:

1. "Nuclear Fuel Assembly" by Robert F. Barry et al, assigned U.S. Ser. No. 368,555 and filed Apr. 15, 1982 now abandoned, and divisional application Ser. No. 550,669, filed Nov. 10, 1983, now U.S. Pat. No. 4,560,532, issued Dec. 12, 1985.

2. "Coolant Flow Paths Within a Nuclear Fuel Assembly" by Pratap K. Doshi, assigned, Ser. No. 794,582, filed Nov. 1, 1985, now allowed, a continuation of U.S. Ser. No. 602,089 and filed Apr. 19, 1984 now abandoned, a continuation of U.S. Ser. No. 368,552, filed Apr. 15, 1982 and now abandoned.

3. "Water Tubes Arranged in Cross-Like Pattern in a Fuel Assembly" by Carl A. Olson et al, assigned U.S. Ser. No. 642,844 and filed Aug. 20, 1984, now U.S. Pat. No. 4,652,426, issued Mar. 24, 1987.

4. "Cross Brace for Stiffening a Water Cross in a Fuel Assembly" by C. K. Lui, assigned U.S. Ser. No. 672,042 and filed Nov. 16, 1984, now U.S. Pat. No. 4,659,543, issued Apr. 21, 1987.

5. "Improved Boiling Water Nuclear Reactor Fuel Assembly" by Rusi Taleyarkhan, assigned U.S. Ser. No. 729,602 and filed May 2, 1985, now allowed.

6. "BWR Fuel Assembly with Water Flow Mixing Chamber at Fuel Bundle/Water Cross Entrance" by Rusi Taleyarkhan, assigned U.S. Ser. No. 746,619 and filed June 19, 1985, now U.S. Pat. No. 4,649,021, issued Mar. 10, 1987.

BACKGROUND OF THE INVENTION

1. Field of the Invention

The present invention relates generally to fuel assemblies for a nuclear reactor and, more particularly, is concerned with a boiling water reactor (BWR) fuel assembly having a water cross with coolant flow entry ports which minimize uncertainties in the amount of flow entering the water cross.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of a self-sustained, nuclear fission reaction. The core is submerged in a flowing liquid, such as light water, that serves as the coolant for removing heat from the fuel rods and as a neutron moderator. Specifically, in a BWR the fuel assemblies are typically grouped in clusters of four with one control rod associated with each four assemblies. The control rod is insertable in between the fuel assemblies for controlling the reactivity of the core. Each such cluster of four fuel assemblies surrounding a control rod is commonly referred to as a fuel cell of the reactor core.

A typical BWR fuel assembly in the cluster is ordinarily formed by an N-by-N array or bundle of the elongated fuel rods. In the present disclosure, an exemplary array of 64 fuel rods in an 8×8 configuration is shown. The fuel rods are supported in laterally spaced-apart relation and are encircled by a tubular outer channel member having a generally rectangular cross-section. Examples of such fuel assemblies are illustrated and described in U.S. Pat. Nos. 3,689,358 to Smith et al and 3,802,995 to Fritz et al, and in Canadian Patent No. 1,150,423 to Anderson et al, as well as in the patent applications cross-referenced above.

In a fuel assembly of this type, the fuel rods in the central region of the bundle thereof may be under-moderated and overenriched. In order to remedy this condition by increasing the moderation in this region of the assembly, several water cross arrangements have been proposed. See, for example, the above cross-referenced Barry et al, Doshi, Lui and Taleyarkhan patent applications.

As disclosed in the aforementioned cross-referenced applications, the central water cross is located within the outer channel member and is formed of four radial panels which together form a cruciform water flow channel which divides the fuel assembly into four separate elongated compartments, with the bundle of fuel rods being divided into mini-bundles disposed in the respective compartments. The water cross thus provides a centrally disposed cross-shaped path for the flow of subcooled neutron moderator water within the channel along the length of, but separate from, adjacent fuel rods in the mini-bundles thereof.

The fuel rods of each mini-bundle extend in laterally spaced-apart relationship between an upper tie plate and a lower tie plate. The fuel rods, selectively connected with the upper and lower tie plates in a known manner, comprise a separate fuel rod subassembly within each of the compartments of the outer channel member. A plurality of grids axially spaced along the fuel rods of each fuel rod subassembly maintain the fuel rods in their laterally spaced relationships. In many applications, the water cross has approximately the same axial length as the fuel rod subassemblies, extending between the upper and lower tie plates thereof.

As mentioned initially, coolant is passed along the fuel rods for removing heat therefrom. In the design of BWRs in the United States, subcooled water enters a bottom nozzle of the fuel assembly through a side entrance. Thereafter, the water is distributed upwardly into the four mini-bundles and the water cross. Typically, flow through the water cross is approximately 9 to 10 percent of the total flow through the fuel bundle. Due to the side entry characteristics of these BWRs, it has been found that significant maldistribution of flow can result at the inlet to each fuel assembly. This, along with complex nozzle flow patterns and crud buildup effects, results in uncertainties in the mass flow actually entering the water cross.

Maldistribution affects the operation of the individual fuel rod mini-bundles. As an example, a deficiency in coolant inlet flow to one mini-bundle can lead to increased boiling of the coolant/moderator in that mini-bundle with a consequent deterioration in the moderation efficiency of the coolant and the loss of neutron fissioning efficiency of that mini-bundle. That loss of power production must be compensated in one of the other mini-bundles in the assembly. This means that that mini-bundle must in turn operate closer to the fuel safety limits than desired. If the water cross has irregular or uncertain flow, the operation of the entire fuel rod assembly may be drastically affected. If the coolant flow to the water cross is too low, boiling of that coolant/moderator can result. This reduces the moderation efficiency of the coolant and the fissioning efficiency of the fuel assembly. That loss of power production leads to the under-utilization of that fuel assembly with its economic penalties. It also means that the remaining fuel assemblies in the core must make up the loss of power production. Therefore, those assemblies are forced to operate closer to the fuel safety limits than desired. Conversely, if the water cross flow is too large, this means that a greater fraction of the coolant flow than desired is diverted to the water cross which is not available to provide heat transfer cooling of the fuel rods in that assembly.

A plot of the water cross inlet orificing loss coefficient vs. orificing flow area is set forth in FIG. 6. In current designs the fuel bundle operates in the relatively steep portion of the curve at $S_1$. Thus, a small change in orifice area may cause a large increase in flow loss, which would in turn lead to possible boiling of water cross moderator fluid and attendant effects as noted above. Further, as the total flow of the bundle is decreased (at constant power) the water cross flow is even more dramatically affected, so that the undesirable results become more likely. If the orificing to the water cross is controlled so as to operate in the relatively flap part $S_2$ of the curve of FIG. 6, changes in orificing losses would not create significant changes in the flow to the water cross.

Consequently, the need exists for further improvement of the BWR fuel assembly so as to eliminate or significantly minimize water cross flow uncertainty, mini-bundle inlet flow maldistribution and crud buildup sensitivity, and thereby avoid the undesirable effects which accompany these conditions.

SUMMARY OF THE INVENTION

The present invention provides a modification which is designed to satisfy the aforementioned needs. Underlying the present invention are the following observations. Assuring a certain amount of water cross flow depends on eliminating sensitivity and crud buildup effects. That is, by providing orificing flow area in the flat portion of the curve in FIG. 6, this assures that there is only a negligible increase in the water cross loss coefficient with any increase in water cross inlet flow area. Due to the pressure loss of the mini-bundle fluid in the bottom nozzle and lower tie plates, a smaller pressure gradient would have to be overcome for a prescribed flow into the water cross if the water-cross entry flow holes are located above the lower tie plate rather than below, as in current designs. These observations lead to the relatively simple solution to the foregoing problems provided by the present invention: close off the water cross flow inlet orificing holes located below the lower tie plate in the present design and, rather, provide communication holes or slots on the sides of the water cross walls in the entrance region at an elevation above the lower tie plate.

Accordingly, the present invention sets forth an improved feature in a BWR fuel assembly. The fuel assembly includes a bundle of elongated fuel rods disposed in side-by-side relationship so as to form an array of spaced fuel rods, a tubular outer flow channel member surrounding the fuel rods so as to direct flow of coolant/moderator fluid along the fuel rods, and a hollow water cross extending centrally through and interconnected with the outer flow channel member so as to divide the outer channel member into separate compartments and the bundle of fuel rods into a plurality of mini-bundles in the respective compartments. The improved feature of the fuel assembly comprises cross flow inlet means in the form of holes in the panels of the water cross between lower end portions of the mini-bundles of fuel rods and above the lower tie plate which minimizes maldistribution of flow between the respective mini-bundles; decreases flow uncertainty to the water cross; and reduces crud build-up sensitivity in the water cross inlet orificing.

More particularly, the cross flow means includes axially opposed holes or orificing in a lower end of confronting panels of the water cross above the lower tie plate, with the water cross lower end extending to the lower tie plates.

These and other advantages and attainments of the present invention will become apparent to those skilled in the art upon a reading of the following detailed description when taken in conjunction with the drawings, wherein there is shown and described an illustrative embodiment of the invention.

BRIEF DESCRIPTION OF THE DRAWINGS

In the course of the following detailed description, reference will be made to the attached drawings, in which:

FIG. 5 is an enlarged perspective view, with parts broken away for clarity, of the water cross of the fuel assembly of FIG. 1 showing the cross flow inlet means in the form of inlet holes.

DETAILED DESCRIPTION OF THE INVENTION

Figure 1:
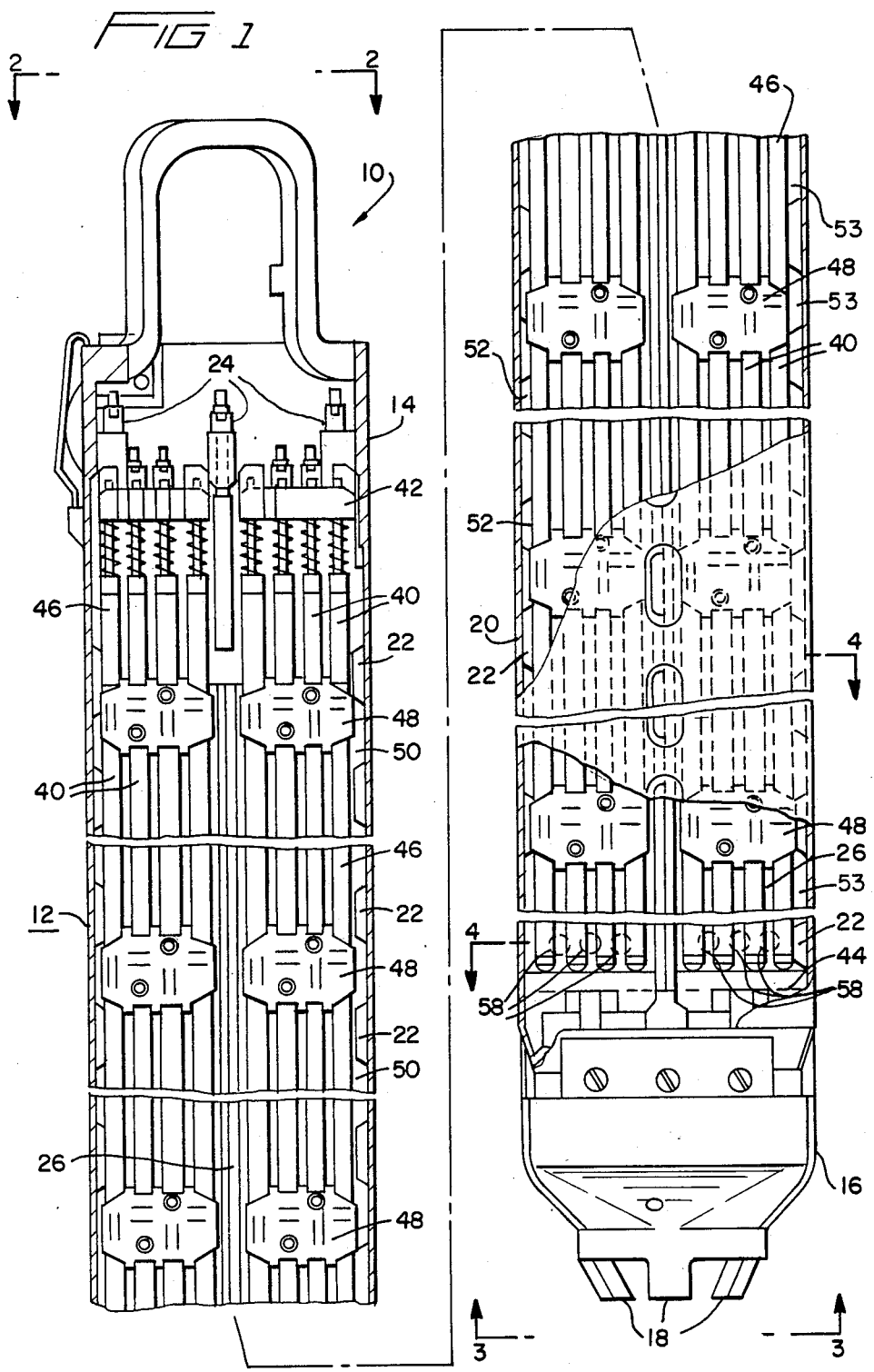
FIG. 1 is an elevational view, with parts broken away and sectioned for clarity, of a BWR nuclear fuel assembly in which the improved feature of the present invention is employed.
Figure 2:
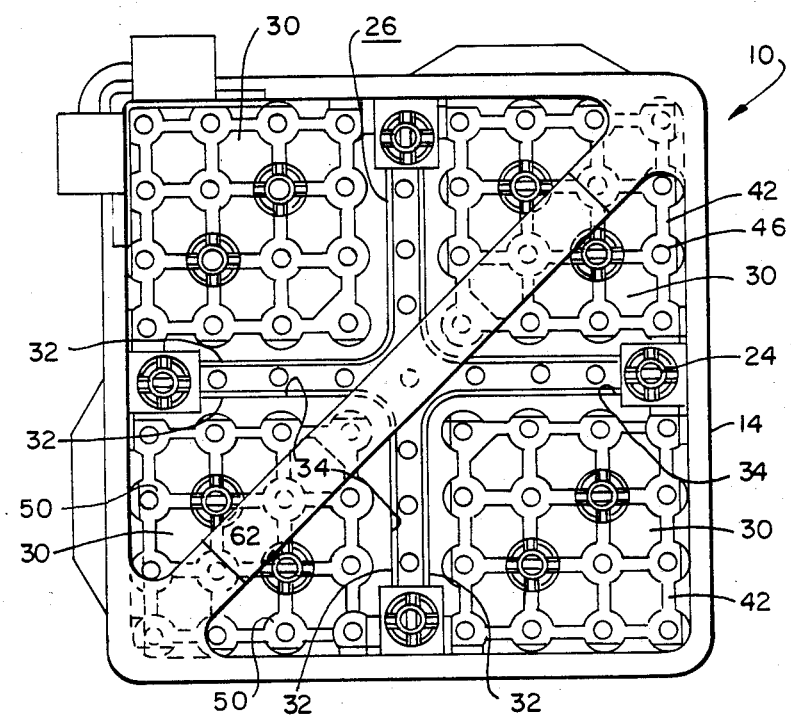
FIG. 2 is an enlarged top plan view of the fuel assembly as seen along line 2—2 of FIG. 1.
Figure 3:
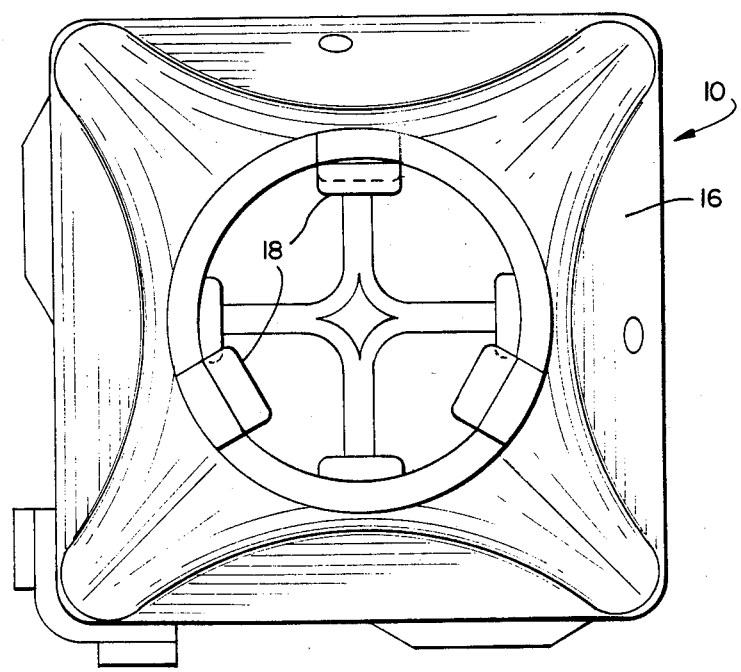
FIG. 3 is an enlarged bottom plan view of the fuel assembly as seen along line 3—3 of FIG. 1.

In the following description, like reference characters designate like or corresponding parts throughout the several views of the drawings. Also in the following description, it is to be understood that such terms as "forward", "rearward", "left", "right", "upwardly", "downwardly" and the like are words of convenience and are not to be construed as limiting terms.

In General

Referring now to the drawings, and particularly to FIGS. 1 to 4, there is shown a nuclear fuel assembly, generally designated 10 for a boiling water nuclear power reactor (BWR), in which the improvement of the present invention is incorporated. The fuel assembly 10 includes an elongated tubular outer flow channel member 12 (hereinafter outer channel member 12) that extends along substantially the entire length of the fuel assembly 10 and interconnects an upper support fixture or top nozzle 14 with a lower base or bottom nozzle 16. The bottom nozzle 16 serves as an inlet for coolant flow into the outer channel member 12 of the fuel assembly 10, and includes a plurality of legs 18 for guiding the bottom nozzle 16 and the fuel assembly 10 into a reactor core support plate (not shown) or into fuel storage racks, for example in a spent fuel pool.

The outer channel member 12 (FIG. 4) is generally of rectangular cross-section, is made up of four interconnected vertical walls 20 each being displaced about ninety degrees one from the next. A plurality of inwardly facing structural ribs 22 are formed in the walls 20 of the outer channel member 12. The ribs 22 are formed in a spaced-apart relationship in the inner surface of each wall 20 of the outer channel member 12. Above the upper ends of the structural ribs 22, a plurality of upwardly-extending attachment studs 24 (FIG. 2) are fixed on the walls 20 of the outer channel member 12 and are used to interconnect the top nozzle 14 to the outer channel member 12.

Fuel rods 40 are supported in an exemplary 8×8 array in a bundle within the outer channel member 12. Upper and lower tie plates 42 and 44, secured in the outer channel member 12, support opposite ends of the fuel rods. A plurality of grids 48 secure the rods laterally in a known manner.

For improving neutron moderation and economy, a hollow water cross 26, as seen in FIGS. 1, 2, 4 and 5, extends axially through the outer channel member 12 so as to provide an open inner channel 28 for subcooled moderator flow through the fuel assembly 10 and to divide the fuel assembly into four separate, elongated compartments 30. The water cross 26 has a plurality of four radial panels 32 composed by a plurality of four elongated, generally L-shaped metal angles or sheet members 34 that extend generally along the length of the outer channel member 12. The sheet members 34 of each panel 32 are interconnected and spaced apart by a series of elements in the form of dimples 36 (FIGS. 4 and 5) as shown. Opposed pairs of contacting dimples 36 are connected together such as by welding to insure that the spacing between confronting sheet members 34 forming the panels 32 of the central water cross 26 is accurately maintained. Upper and lower closures 54 and 52 (FIG. 5) seal or close the respective upper and lower ends 38 and 39 of the water cross 26. Outlets 66 are provided in the upper closure 54.

The hollow water cross 26 is mounted to the angularly displaced walls 20 of the outer channel member 12. Preferably, the outer elongated, lateral ends of the panels 32 of the water cross 26 are connected such as by welding to the structural ribs 22 along the lengths thereof in order to securely retain the water cross 26 in its desired central position within the fuel assembly 10. Further, inner surfaces of the sheet members 34 together with the outer ends thereof define the inner central cruciform channel 28 which extends the axial length of the hollow water cross 26.

The bundle of fuel rods 40 which, in the illustrated embodiment, number sixty-four in an 8×8 array, are separated by the water cross 26 into the four compartments 30, each housing a fuel mini-bundle or subassembly 46. The fuel rods 40 of each mini-bundle, such being sixteen in number in a 4×4 array, extend in laterally spaced-apart relationship between upper and lower tie plates 42 and 44. The fuel rods 40 in each mini-bundle are connected to the upper and lower tie plates 42, 44 and together therewith comprise a separate fuel rod subassembly 46 within each of the compartments 30 of the outer channel member 12. The grids 48, axially spaced along the fuel rods 40 of each fuel rod subassembly 46, maintain the fuel rods 40 in laterally spaced relationship. The lower and upper tie plates 44, 42 of the respective fuel rod subassemblies 46 have flow openings 50 defined therethrough for allowing the low of the coolant/moderator fluid into and from each separate fuel rod subassembly 46. Also, coolant flow paths provide flow communication between the fuel rods subassemblies 46 in the respective separate compartments 30 of the fuel assembly 10 through a plurality of openings 53 formed between each of the structural ribs 22 along the lengths thereof. Coolant flow through the openings 53 serves to equalize the hydraulic pressure between the four separate compartments 30, thereby minimizing the possibility of thermal hydrodynamic instability between the separate fuel rod subassemblies 46. Openings 68 in the sheet members 34 may be provided to supply subcooled moderator fluid to the central portion of each fuel rod subassembly 46.

Cross Flow Inlet Means at Fuel Bundle Entrance

Figure 4:
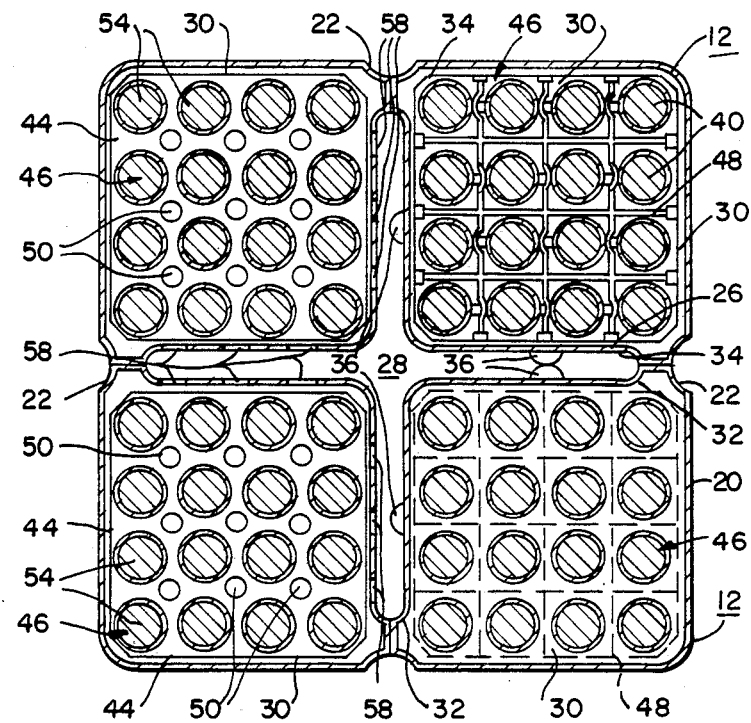
FIG. 4 is an offset cross-sectional view of the fuel assembly taken along line 4—4 of FIG. 1, showing in the upper right quadrant of the drawing the fuel rod bundle of the fuel assembly being separated into separate mini-bundles by the water cross with a grid surrounding one of the mini-bundles being shown in full, while the grid surrounding the lower right mini-bundle is shown in outline form, and showing in the left half of the drawing the cross flow inlet means in the water cross panels at the entrance of the fuel bundle.

Referring now to FIGS. 1, 4 and 5, there is seen the feature incorporated in the BWR fuel assembly 10 which provides an inlet to the water cross 26 and allows cross flow of fluid near the lower ends of the respective fuel rod mini-bundles of the separate fuel rod subassemblies 46 and in such manner minimizes maldistribution of flow between the mini-bundles.

Referring again to FIG. 5, the water cross 26 shown in perspective includes the aforementioned respective bottom and top closure means 52 and 54. The improvement comprises side entry cross flow inlet means 58 in the form of holes in the water cross sheet members 34 at a lower end 38 thereof.

The top closure 54 at the upper end 39 of the water cross 26 has its outlet holes 66 sized so as to limit the outlet of the water cross 26 to an open area less than the open area of the cross flow inlet means 58. In such manner, a positive pressure gradient is maintained in the subcooled moderator flow through the water cross inner flow channel 58 relative to the coolant/moderator flow through the fuel rod subassemblies 46 in outer flow channel 12.

Specifically, the outlet holes 66 in the top closure means 54 are each of a predetermined diameter size which is less than the predetermined diameter size of each of the holes forming cross flow inlet means 58 in the sheet members 34. Such relationship distributes the hydraulic losses such that greater loss is experienced at the outlet than at the inlet of the water cross 26. Also, the arrangement reduces the static pressure loads at the inlet and the risk of failure of dimple welds which interconnect the pairs of sheet members 34 of the water cross 26.

The holes 58 are preferably located in opposition to each other in confronting sheet members 34 and are generally axially aligned as shown. The holes 58 are preferably within a few centimeters above the respective lower ends of the mini-bundles 46 and the lower tie plate 44.

In the current conventional design, inlet pressure drives the coolant/moderator into the water cross 26 through openings below the lower tie plate 44, and coolant/moderator enters the mini-bundle through openings the lower tie plate 44.

In the proposed design, the inlet pressure drives coolant/moderator into the mini-bundle through resized lower tie plate holes 50, and coolant/moderator is driven into the water cross 26 through the side entry cross flow inlet means 58 therein above lower tie plate 44.

The driving force for coolant into the water cross 26 in the current design is the pressure gradient or difference in inlet pressure P1 less the resulting water cross pressure P3 (or P1−P3). In the invention, the driving force is the difference between the water cross pressure P3 and the mini-bundle pressure P2 (or P2−P3), which is less than (P1−P3). In order to achieve a certain selected flow $W_C$ to the water cross for a given pressure drop $\Delta P$ the following expression is used:

$$\Delta P = K W_C^2$$

where K denotes the effective loss coefficient.

If $\Delta P$ is to be reduced for a selected $W_C$, then K must necessarily be decreased. In the present invention, the pressure gradient P2−P3 driving the coolant/moderator into the water cross is less than the pressure gradient (P1−P3) in the current design. Therefore, the effective loss coefficient at the inlet to the water cross can be decreased. This is accomplished by increasing the flow area at the water cross inlet. Thus, in FIG. 6, the reduced loss coefficient allows the operation in the shallow part of the curve at $S_2$.

In the proposed design, the lower tie plate loss coefficient is also decreased in order to achieve the same pressure drop P1−P2 between the inlet and mini-bundle. This occurs because the total flow $W_T$, although the same in both designs, is rerouted through the mini-bundles in the proposed design by closure of the inlets to the water cross below the lower tie plates. The low to the mini-bundles is thus increased by about 10%, by upwardly resizing the holes in the lower tie plates to produce a lower loss coefficient according to the following expression:

$$K' W_T^2 = K(W_T - W_C)^2$$

where K' is the new loss coefficient for the lower tie plate, $W_T$ is total flow through the tie plates, and K is the original loss coefficient for the lower tie plate.

Hole size determination may be made by relatively straightforward and simple experiments based on known parametric data. The important feature of the present invention is to determine the apppropriate loss coefficients which achieve improved results. Thereafter, hole sizing is implemented to achieve the desired loss coefficients.

The proposed improvement provides for better control and lesser uncertainty in the amount of flow entering the water cross 26. This has direct bearing on the amount of voids formed and consequent degradation in nuclear performance. Again, crud buildup effects are also subdued. The opposed axial alignment of holes 58 provides for direct communication between the mini-bundles and helps minimize flow maldistribution, consequently also minimizing any degradation in bundle CHF performance which might result from the flow maldistribution. About 4% to 7% improvement in bundle CHF margin can be expected from total elimination of inlet flow maldistribution.

Reducing the possibility of generating voids in the water cross also improves the transient thermal hydraulic performance, especially the hydrodynamic stability of the assembly.

It is felt that the proposed modification should prove largely beneficial from the standpoint of structural characteristics. For example, the proposed side entry cross flow inlet means reduces the pressure gradient across each of the four water cross panels. This pressure gradient reduction consequently improves the fatigue-related performance of the fuel bundles 10 and water cross structure 26.

This disclosure has focused on an invention to minimize water cross flow rate uncertainties and related undesirable effects. The proposed design modification involves closing off the water cross inlet and diverting liquid into the water cross from above the minibundle lower tie plates via holes or slots machined into the water cross walls. This simple modification miminizes uncertainties in the amount of flow entering the water cross and the flow maldistribution between the mini-bundles. The modification also provides direct benefits by reducing any crud buildup-related penalties.

The present invention also has some important safety implications in the context of a so-called loss of coolant accident (LOCA). The repositioning of the water cross entry inlet flow holes 58 to the side of the water cross panels 34 and above the lower tie plates 44 is expected to provide benefits during a loss of coolant accident. In the early stages of such an accident, coolant is sprayed into the top of each fuel assembly 10 to provide cooling heat transfer. The coolant spray may be unable to penetrate into the assembly, however, because it is resisted by the steam produced from the residual heat in the fuel. This condition is referred to as being counter-current flow limited (CCFL). Later in the accident, water is injected from the safety injection systems (not shown) at the bottom of the fuel assemblies in the same manner that coolant normally enters the fuel bundles 10. This is called the reflood portion of the accident. The holes 58 in the water cross 26 situated above the lower tie plates 44 provide benefits during both the CCFL and reflood portions of the accident.

During the CCFL portion, spray coolant can travel down through the water cross 26, exit through the holes 58 and flow up through the fuel mini-bundles. This helps to more quickly quench the steam and allow the coolant spray, restricted to the top of the bundle, to penetrate throughout the bundle. With the entry holes 58 located above the lower tie plates 44, the downwardly directed water cross flow does not have to overcome the resistance of the lower tie plate 44 as in the current design where the watercross flow holes are located below the lower tie plate. Therefore, more flow is available from the water cross 26 to travel up the fuel mini-bundles and help quench the steam. The CCFL condition is therefore more quickly overcome.

In the current design, with the flow holes located below the lower tie plate, during the reflood portion of the accident, a certain fraction of the injected water is diverted to the water cross 26. Consequently, that flow is not available to provide heat transfer cooling of the fuel rods. In the proposed invention, the holes 58 are moved instead to the side of the water cross sheet members 34 and above the lower tie plates 44. With this design, all of the injected water flows up through the lower tie plates 44 and most of that injected water continues to travel up through the fuel mini-bundles to provide cooling. Only after sufficient coolant pressure is re-established within the fuel mini-bundles does some of the injected water get diverted up through the water cross instead of up through the mini-bundles. Thus, the invention results in a design which has safety advantages not available with prior arrangements.

Figure 6:
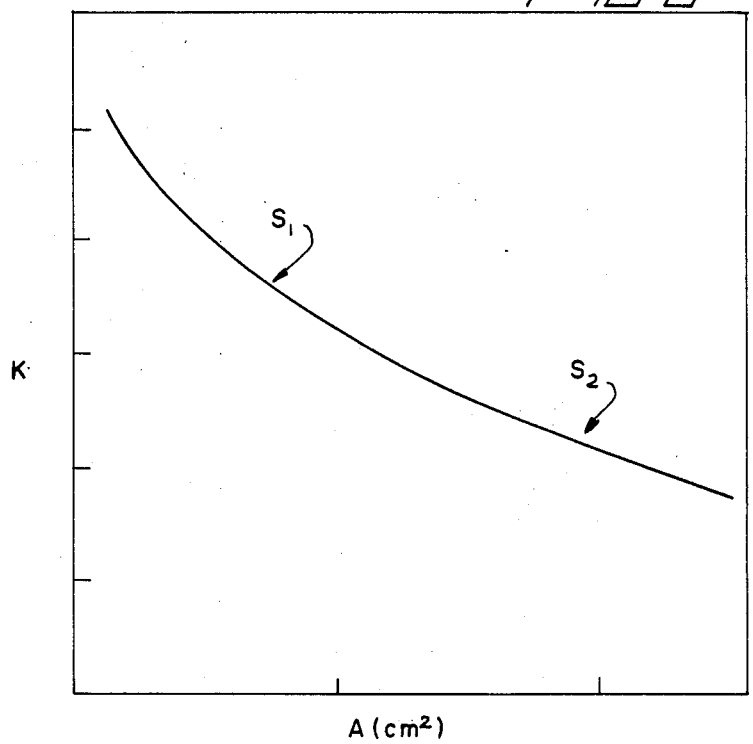
FIG. 6 is a plot of a typical curve showing the water cross loss coefficient (K) vs. water cross cross-sectional area (A).

The pressure drop across the tie plate of the improved fuel bundle without water cross inlets shall be adjusted to be less than the pressure drop across a conventional tie plate having inlets to the water cross because the tie plate orifice losses associated with the water cross inlets have been eliminated. Thus, in the present invention the loss coefficient shown in FIG. 6 is reduced from $S_1$ to $S_2$. As the slope of the curve in FIG. 6 becomes shallow in the $S_2$ portion, uncertainties in the inlet area result in lower uncertainties in the loss coefficient. Therefore, the embodiment of the present invention is less sensitive to crud buildup and the flow to the water cross is less uncertain.

It is thought that the invention and many of its attendant advantages will be understood from the foregoing description, and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim as our invention:

1. A nuclear reactor fuel assembly comprising a bundle of elongated fuel rods disposed in side-by-side relationship so as to form an array of spaced fuel rods, a tubular flow channel member surrounding said fuel rods so as to direct flow of coolant/moderator fluid along said fuel rods, respective upper and lower tie plates at opposite ends of said fuel rods, and a hollow water cross having confronting side walls and a closed lower end wall at an inlet end thereof, said water cross extending centrally through and disposed within said flow channel member so as to provide within said flow channel member separate compartments and to divide said bundle of fuel rods into a plurality of mini-bundles being disposed in said respective compartments, said water cross including inlet cross flow means formed in said side walls near a lower end of said water cross above said closed end wall and near lower end portions of each of said mini-bundles of fuel rods, which inlet cross flow means provides both selected flow communication into the interior of said water cross and flow communication between said respective mini-bundles for minimizing maldistribution and equalizing flow therebetween.

2. The fuel assembly as recited in claim 1, wherein said inlet cross flow means is in the form of opposed, axially aligned side entry holes in said water cross.

3. The fuel assembly as recited in claim 2, wherein said holes are located within a few centimeters above the lower tie plate.

4. The fuel assembly as recited in claim 3, wherein said water cross has outlets of a predetermined area and said inlet cross flow means has an area greater than said outlet area.

5. A nuclear reactor fuel assembly comprising a bundle of elongated fuel rods disposed in side-by-side relationship so as to form an array of spaced fuel rods, a tubular flow channel member surrounding said fuel rods so as to direct flow of coolant/moderator fluid along said fuel rods, a hollow water cross extending centrally through said flow channel member, said water cross having opposed side walls, a closed end wall at a lower flow inlet end and an opposite upper flow outlet end, and being interconnected with said flow channel member so as to divide said flow channel member into separate compartments and said bundle of fuel rods into a plurality of mini-bundles, a pair of lower and upper tie plates connected to the opposite ends of said fuel rods in each mini-bundle so as to provide a separate fuel rod subassembly in each of said compartments, said lower and upper tie plates having flow openings defined therethrough for allowing the flow of said coolant/moderator fluid respectively into and from said separate fuel rod subassembly, and inlet cross flow means located near said inlet end of said water cross and formed in said side walls at an elevation spaced above said lower tie plate so as to provide flow into the interior of said water cross and to provide cross flow between said respective mini-bundles of fuel rods to thereby minimize maldistribution of flow therebetween.

6. The fuel assembly as recited in claim 5, wherein each of said fuel rod subassemblies includes a plurality of axially spaced grids for maintaining said fuel rods of its mini-bundle thereof in side-by-side spaced relationship, said inlet cross flow means being located at an axial height less than the axial distance from said lower tie plate to said lowermost one of said axially spaced grids of said each fuel rod subassembly.

7. The fuel assembly as recited in claim 5, wherein said inlet cross flow means includes opposed axially aligned holes in opposed walls of said water cross.

8. The fuel assembly as recited in claim 5, wherein said holes are located within several centimeters above the lower tie plate.

9. A nuclear reactor fuel assembly comprising a plurality of elongated fuel rods disposed in side-by-side relationship so as to form an array of spaced fuel rods, a tubular flow channel member surrounding said fuel rods so as to direct flow of coolant/moderator fluid along said fuel rods, and a hollow water cross extending through said outer flow channel and having a plurality of panels extending radially from a central axis thereof, said panels being composed of respective pairs of spaced-apart, opposed confronting sheet members interconnected together so as to define an open inner cruciform flow channel for subcooled moderator fluid flow through said fuel assembly and disposed within said tubular flow channel member so as to divide said array of fuel rods into a plurality of fuel rod subassemblies, said water cross having a top end wall formed with outlets of a selected total area, a closed bottom end wall, and opposed inlet holes formed in said sheet members of said water cross near said closed end wall and said lower ends of said fuel rod subassemblies for supplying flow of said subcooled moderator into the interior of said water cross and for supplying cross flow between the subassemblies for minimizing maldistribution therebetween, said inlet holes being of a total area greater than the total area of said outlets for creating positive pressure of the coolant/moderator fluid in said water cross.

10. The fuel assembly as recited in claim 9, wherein opposed holes in each of said opposed confronting sheet members of said water cross are axially aligned.

11. The fuel assembly as recited in claim 9, wherein all of said opposed holes are at substantially the same elevation above the lower inlet of said water cross.

* * * * *